United States Patent
Martin

(10) Patent No.: US 11,428,701 B2
(45) Date of Patent: Aug. 30, 2022

(54) ARRANGEMENT FOR AN INVITRO-DIAGNOSTICS SYSTEM AND METHOD FOR OPERATING

(71) Applicant: Roche Diagnostics Operations, Inc., Indianapolis, IN (US)

(72) Inventor: Thomas Martin, Stuttgart (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 217 days.

(21) Appl. No.: 17/025,495

(22) Filed: Sep. 18, 2020

(65) Prior Publication Data

US 2021/0096146 A1   Apr. 1, 2021

(30) Foreign Application Priority Data

Sep. 26, 2019   (EP) ..................................... 19199824

(51) Int. Cl.
*G01N 35/02*   (2006.01)
*G01N 35/00*   (2006.01)

(52) U.S. Cl.
CPC ..... *G01N 35/026* (2013.01); *G01N 35/00732* (2013.01); *G01N 35/00871* (2013.01); *G01N 2035/00752* (2013.01)

(58) Field of Classification Search
CPC ....... G01N 35/026; G01N 2035/00752; G01N 35/00732; G01N 35/00871; G01N 35/0095; G01N 2035/0406; G01N 2035/00326; G01N 2035/00801; G16H 40/40; G16H 10/40

See application file for complete search history.

(56) References Cited

U.S. PATENT DOCUMENTS

| | | | | |
|---|---|---|---|---|
| 4,827,907 A | * | 5/1989 | Tashiro | A61B 1/05 600/109 |
| 2009/0163785 A1 | * | 6/2009 | Nelson | A61B 5/0059 600/322 |
| 2018/0314046 A1 | * | 11/2018 | Sakurai | G02B 21/14 |
| 2019/0228846 A1 | * | 7/2019 | Pollack | G01N 35/0095 |

FOREIGN PATENT DOCUMENTS

| | | |
|---|---|---|
| WO | 2014/138533 A1 | 9/2014 |
| WO | 2018/017753 A1 | 1/2018 |

* cited by examiner

*Primary Examiner* — Shogo Sasaki
(74) *Attorney, Agent, or Firm* — Roche Diagnostics Operations, Inc.

(57) ABSTRACT

An in-vitro diagnostics system arranged is presented. The system comprises a track, carriers to carry samples with data carriers, and a control station comprising a camera to detect sample images, a data carrier reader, a relocation device to relocate the sample, and a controller. The data carrier reader reads the data carrier through a read-out window. Measurement data indicates data carrier characteristics on a sample in a starting position determined from the camera images. Obscuring data indicates obscuring of part of the data carrier when the images are detected in the starting position. The controller determines, from the measurement data and the obscuring data, characteristics of the data carrier comprising location and size of the data carrier. Based on the data carrier characteristics, the sample is relocated relative to the read-out window from the starting position into a read-out position optimizing visibility of the data carrier through the read-out window.

9 Claims, 3 Drawing Sheets

ARRANGEMENT FOR AN INVITRO-DIAGNOSTICS SYSTEM AND METHOD FOR OPERATING

CROSS-REFERENCE TO RELATED APPLICATIONS

This application claims priority to EP 19199824.4, filed Sep. 26, 2019, which is hereby incorporated by reference.

BACKGROUND

The present disclosure generally relates to an arrangement for an in-vitro diagnostics system and a method for operating.

In-vitro diagnostics systems are applied to test samples such as blood or tissue samples that have been taken from the human body. In-vitro diagnostics can detect diseases or other conditions and can be used to monitor a person's overall health to help cure, treat, or prevent diseases. In-vitro diagnostics also may be applied in precision medicine to identify patients who are likely to benefit from specific treatments or therapies. Some in-vitro diagnostics tests are used in laboratory or other health professional settings.

Placement of the sample vessels within a known carriers can affect the visibility of detectable features of the sample vessels, such as optically detectable features. For example, a portion of the view of a sample slot may be obscured by a holding element of the carrier, such as a tine that holds the sample vessel in a slot. The tines that hold the sample vessels in the carrier may extend substantially up the sides of each sample vessel. Typically, barcodes may be placed in the form of stickers manually affixed to the walls of sample vessels. While the barcodes may extend around a substantial portion of the circumference of each sample vessel, the tine or another holding or supporting element may obscure a substantial portion of that barcode, thereby, providing for a blind spot.

In some known systems, the blind spot is eliminated by moving the sample vessel to a different sample slot in the carrier. When a sample vessel is placed in the carrier, a sample-handling robot will view and consider the position of the barcode on the sample vessel and automatically chose a position within the multi-slot carrier, where the configuration of the slot and the orientation of the barcode provides an unobscured line of sight to cameras within the characterization station. Such unobscured line is provided by replacing the sample vessel from one slot to different slot in the carrier. This requires complex handling of the sample vessel, including steps for taking out the sample vessel, holding the sample vessels while it is moved to the new slot and placing the sample vessel in the new slot in the carrier.

Therefore, there is a need for an arrangement for an in-vitro diagnostics system and a method for operating which support secure and safe handling of sample vessels received in a carrier of an automation track.

SUMMARY

According to the present disclosure, an arrangement for an in-vitro diagnostics system is disclosed. The arrangement can comprise an automation track and a plurality of carriers configured to carry one or more sample vessels along the automation track. The one or more sample vessels can each be provided with a data carrier. The arrangement can also comprise a control station placed along the automation track. The control station can comprise a camera device configured to detect images of a sample vessel from the one or more sample vessels received in a carrier from the plurality of carriers. The images can show the data carrier on the sample vessel at least in part. The control station can also comprise a data carrier reader configured to read the data carrier on the sample vessel carried by the carrier through a read-out window. The read-out window can be provided by an opening of the carrier at least partially enclosed by structural members of the carrier. The control station can also comprise a relocation device configured to relocate the sample vessel in the carrier in response to control data and a control device in communication with the camera device and the relocation device. The control device can be configured to provide measurement data indicating measured characteristics of the data carrier on the sample vessel when the sample vessel is located in a starting position, the measured characteristics determined from the images detected by the camera device, provide obscuring data indicating obscuring of a part of the data carrier by a structural member of the carrier when the images are detected while the sample vessel is located in the starting position, determine, from the measurement data and the obscuring data, characteristics of the data carrier being different from the measured characteristics and comprising location of the data carrier on the sample vessel and size of the data carrier, and provide, based on the characteristics of the data carrier, the control data configured to relocate the sample vessel relative to the read-out window from the starting position into a read-out position providing optimized visibility for reading the data carrier through the read-out window by the data carrier reader Accordingly, it is a feature of the embodiments of the present disclosure to provide for an arrangement for an in-vitro diagnostics system and a method for operating which support secure and safe handling of sample vessels received in a carrier of an automation track. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
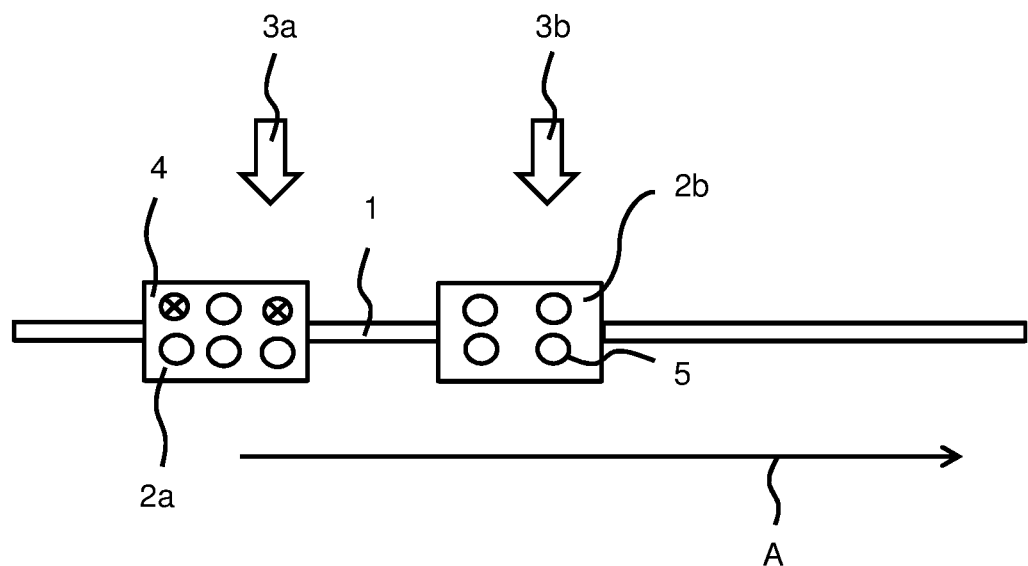
FIG. 1 illustrates schematic representation of an automation track for an arrangement for in-vitro diagnostics system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

According to one embodiment, an arrangement for an in-vitro diagnostics system is provided. The arrangement can comprise an automation track and a plurality of carriers configured to carry one or more sample vessels along the automation track. The one or more sample vessels each can be provided with a data carrier. The arrangement can also comprise a control station placed along the automation track. The control station can be provided with the following: a camera device configured to detect images of a sample vessel from the one or more sample vessels in received in a carrier from the plurality of carriers, the images showing the data carrier provided on the sample vessel at least in part; a data carrier reader configured to read the data carrier on the sample vessel carried by the carrier through a read-out window, wherein the read-out window can be provided by an opening of the carrier at least partially enclosed by structural members of the carrier; a relocation device configured to relocate the sample vessel on the carrier in response to control data; and a control device in communication with the camera device. The control device can be configured to: provide measurement data indicating measured characteristics of the data carrier on the sample vessel when the sample vessel is located in a starting position, the measured characteristics determined from the images detected by the camera device; provide obscuring data indicating obscuring of a part of the data carrier by a structural member of the carrier when the images are detected while the sample vessel is located in the starting position; determine, from the measurement data and the obscuring data, characteristics of the data carrier being different from the measured characteristics and comprising a location of the data carrier on the sample vessel and a size of the data carrier; and provide, based on the characteristics of the data carrier, the control data configured to relocate the sample vessel relative to the read-out window from the starting position into a read-out position providing optimized visibility for reading the data carrier through the read-out window by the data carrier reader.

According to another embodiment, a method of operating an arrangement in an in-vitro diagnostics system is provided. The method can comprise providing an automation track, providing a plurality of carriers carrying one or more sample vessels along the automation track, wherein the one or more sample vessels each are provided with a data carrier, and operating a control station placed along the automation track. The operating of the control station can comprise the following: detecting, by a camera device, images of a sample vessel from the one or more sample vessels received in a carrier from the plurality of carriers, the images showing the data carrier provided on the sample vessel at least in part; reading, by a data carrier reader, the data carrier on the sample vessel carried by the carrier through a read-out window, wherein the read-out window is provided by an opening of the carrier at least partially enclosed by structural members of the carrier; relocating, by a relocation device, the sample vessel on the carrier in response to control data; and providing a control device in communication with the camera device and the relocation device. The method, in the control device, can further comprises: providing measurement data indicating measured characteristics of the data carrier on the sample vessel when the sample vessel is located in a starting position, the measured characteristics determined from the images detected by the camera device; providing obscuring data indicating obscuring of a part of the data carrier by a structural member of the carrier when the images are detected while the sample vessel is located in the starting position; determining, from the measurement data and the obscuring data, characteristics of the data carrier being different from the measured characteristics and comprising a location of the data carrier on the sample vessel and a size of the data carrier; and providing, based on the characteristics of the data carrier, the control data configured to relocate the sample vessel relative to the read-out window from the starting position into a read-out position providing optimized visibility for reading the data carrier through the read-out window by the data carrier reader.

In the control device, in a preliminary step, the measurement data can be provided, the measurement data indicating measured characteristics of the data carrier provided on the sample vessel. However, part of the data carrier can be obscured by the structure member or element of the carrier, thereby, causing one or more blind spots. Information about such obscuring can be provided by obscuring data. Following, actual characteristics of the data carrier can be determined by processing or analyzing the measurement data and the obscuring data, thereby, "correcting" the measured characteristics (comprising the obscured part (blind spot) of data carrier). After (corrected) characteristics of the data carrier are determined, the control data can be generated for relocating or moving the sample vessel relative to the read-out window into the read-out position in which optimized or improved visibility (line of sight) for reading the data carrier through the read-out window by the data carrier reader can be provided. Misreading or misinterpretation of the data carrier can be avoided. The sample vessels can be more safely handled in the arrangement for the in-vitro diagnostics system.

In response to the control data, the sample vessel in the carrier can be relocated or moved. Relocation, for example, may be provided by rotation of the sample vessel within a receiving opening in which the sample vessel can be received in both the starting position and the read-out position. Relocation or movement of the sample vessel in response to the control data can provide for relative movement of the sample vessel carried in the data carrier with respect to the read-out window. Relocation of the sample vessel may provide, for example, optimized overlapping between the read-out window and the data carrier along a direction (view) of measurement (line of sight) while the images can be taken by the camera device.

The read-out window may be provided by an opening having a substantially round or a square shape. A slit opening may be provided.

The data carrier may comprise at least one of a one-dimensional barcode, a two-dimensional barcode, a three-dimensional barcode, a matrix barcode, and QR code. Alternatively, the data carrier may be provided by a Radio Frequency Identification (RFID) tag. The data carrier reader may be provided as a scanner device configured to read-out data carriers of one or more types.

The control device may be further configured to determine the obscuring data by taking into account structural member data indicating at least one characteristic of the structural member selected from the following group: size of the structural member, shape of the structural member, location of the structural member on the carrier, size of an obscured area (blind spot), and shape of the obscured area. The obscuring data can comprise information about characteristics of the structural member. Thereby, determination of the characteristics of the data carrier can be further improved. For example, shape of a blind spot on the data carrier and data about the shape of the structural member can be analyzed for determining the characteristics of the data carrier (corrected for the blind spot). The characteristics of the data carrier can be determined more correctly. In response, relocation or alignment of the sample vessel in the carrier can be applied with higher precision. Structural member data, for example, may be derived from the images by digital image analysis. Alternatively, or in addition, structural member data may be provided from a database comprising electronic data indicating characteristics of one or more structural members of the carrier and/or the carrier as whole.

The read-out window may be provided by an opening of the carrier at least partially enclosed by at least one of a wall member of the carrier and a fixing or supporting member provided for fixing/supporting the sample vessel on the carrier. For example, the fixing member may be provided as a finger element holding or supporting the sample vessel in the carrier. The fixing member may be a flexible fixing member, which can be flexibly bent in response to some force applied.

The measured characteristics of the data carrier determined from the images detected by the camera device may indicate, for the data carrier, at least one of measured size and measured location in the sample vessel. At least one of the measured size and the measured location may be corrected or amended in the process of determining the characteristics of the data carrier, thereby, providing a corrected size and/or a corrected location for the data carrier on the sample vessel.

The control device may be further configured to provide window data indicating at least one characteristic of the read-out window selected from the following group: size of the read-out window, shape of the read-out window, location of the read-out window on the carrier, and position of the read-out window relative to the data carrier reader. For example, with respect to the size/shape of the read-out window, the window data may indicate a first window range of the read-out window provided with a first dimension and a second window range of the read-out window provided with a second dimension, the second dimension being different from the first dimension. In the process of relocation of the sample vessel (within the slot in which the sample vessel is received), visibility of the data carrier may be optimized for one of the first and second window range. For example, the data carrier may be positioned centralized with respect to the first or the second window range.

For example, the window data may be used for determining improved overlapping between the data carrier to be read-out by the data carrier reader and the read-out window. In one embodiment, the data carrier may be provided in a center position relative to the read-out window in the read-out position. It may be provided that border or edge areas of the data carrier are (still) not visible through the read-out window by the data carrier reader in the read-out position. However, by positioning the data carrier relative to the read-out window in response to the control data, an optimized read-out positioning can be applied for the data carrier in relation to the read-out window. Such positioning can be optimized because of taking into account the obscuring data, thereby, avoiding non-correct reading of the data carrier.

The control device may be further configured to determine characteristics of the data carrier from the measurement data, the obscuring data, and the window data.

The control device may be configured to determine the obscuring data by taking into account data indicating at least one characteristic of an arrangement of structural members from the following group: number of structural members, identification of a selected structural member potentially obscuring part of the data carrier; and distance between structural members. For example, the data indicating the characteristic of the arrangement may provide information about neighboring structural members in the arrangement of structural members.

Referring initially to FIG. 1, FIG. 1 shows a schematic representation of an automation track 1 for an arrangement for an in-vitro diagnostics system. The automation track 1, for example, may be provided in an in-vitro diagnostics system applied to test samples such as blood or tissue samples that have been taken from the human body. The in-vitro diagnostics tests may be used in laboratory or other health professional settings.

The automation track 1 can be provided with a plurality of carriers 2a, 2b which can be moveable along the automation track 1 in a direction indicated by an arrow A in FIG. 1. By moving the carriers 2a, 2b along the automation track 1, the carriers 2a, 2b may be moved to different handling or operation stations 3a, 3b of the in-vitro diagnostics system. In the different handling or operation stations 3a, 3b, a plurality of application steps may be applied to sample vessels 4 received in slots 5 of the carriers 2a, 2b. For example, an optical analysis may be applied to a sample provided in one of the sample vessels 4 in the operation station 3b. Different arrangements for in-vitro diagnostics systems provided with an automation track are known as such.

Figure 2:
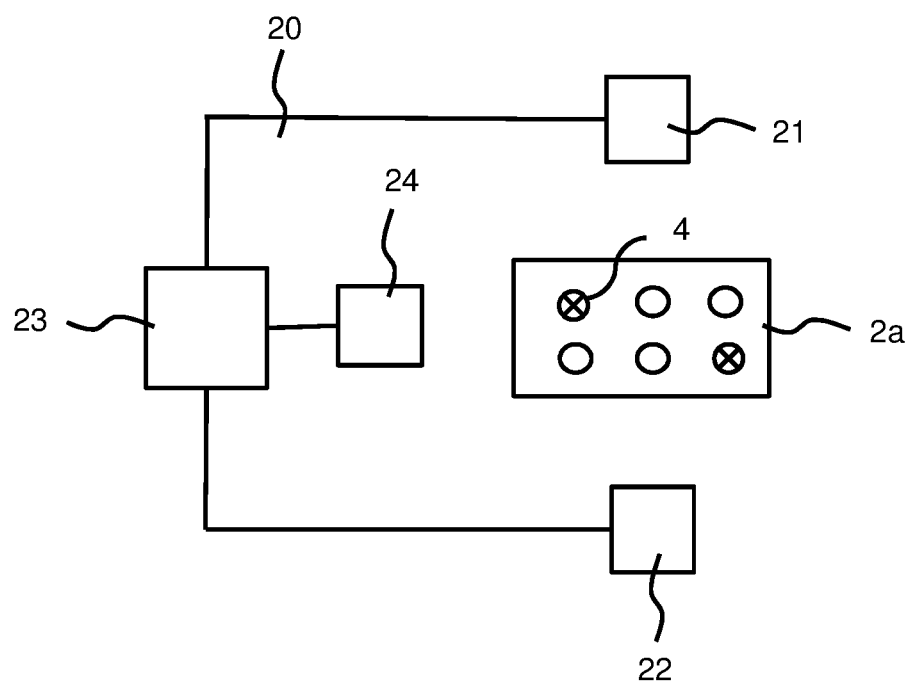
FIG. 2 illustrates a schematic representation of an arrangement for a control station in the for in-vitro diagnostics system according to an embodiment of the present disclosure.

FIG. 2 shows a schematic representation of a control station 20. The control station 20 can be provided with a camera device 21 configured to detect images of the sample vessel 4 received in the carrier 2a. The images can show a data carrier provided on the sample vessel 4 at least in part. The data carrier (see also FIGS. 3 and 4 below) can provide information about the sample vessel 4, for example, date of generation, a location of origin and/or sample content. The data carrier may be provided with at least one of the following: a one-dimensional barcode, a two-dimensional barcode, a three-dimensional barcode, a matrix barcode, and a QR code. In addition, an RFID tag may be provided.

The information provided on the data carrier can be read out by a data carrier reader 22, for example, by a scanner device. The data carrier reader 22 can be configured to read out the data carrier on the sample vessel 4 through a read out window 30 (see FIGS. 3 and 4). In an alternative example, the data carrier reader 22 may be implemented by the camera device 21.

The camera device 21 and the data carrier reader 22 can be in communication with a control device 23 provided in the control station 20. The control device 23 can be configured to generate control data, which can be provided to a relocation device 24 connected to the control device 23. The relocation device 24 can be configured to relocate the sample vessel 4 in the carrier 2a. Such relocation or moving, for example, can be applied by rotating the sample vessel 4 within the slot 5, thereby, relocating the sample vessel 4 from a first location to a read out location which can provide improved visibility (line of sight) of the data carrier received on the sample vessel 4 for reading out the information on the data carrier by the data carrier reader 22.

Figure 3:
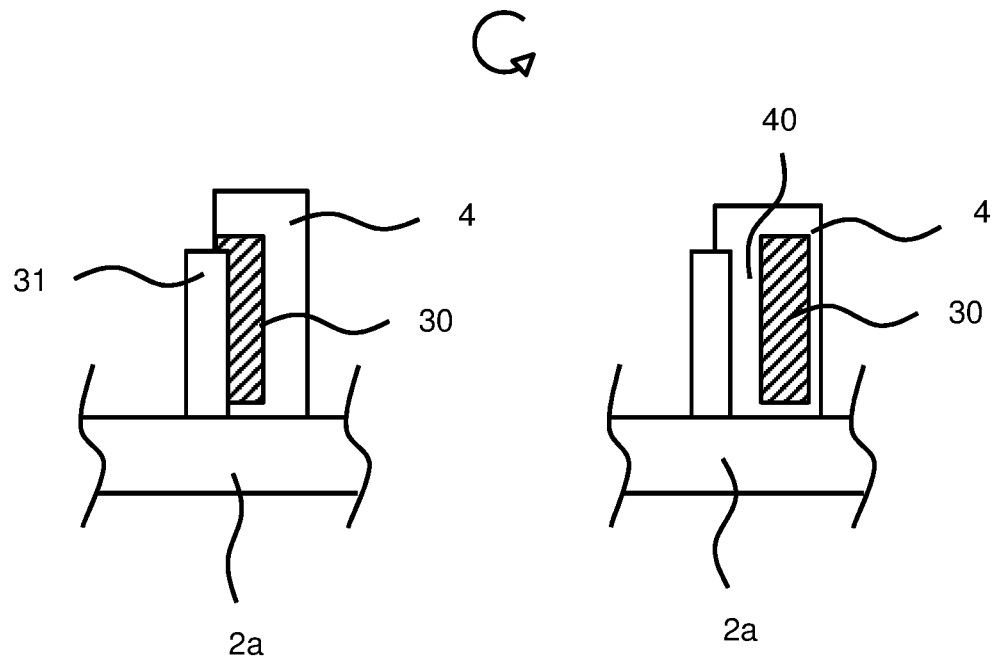
FIG. 3 illustrates a schematic representation of a sample vessel received in a slot of a carrier according to an embodiment of the present disclosure.
Figure 4:
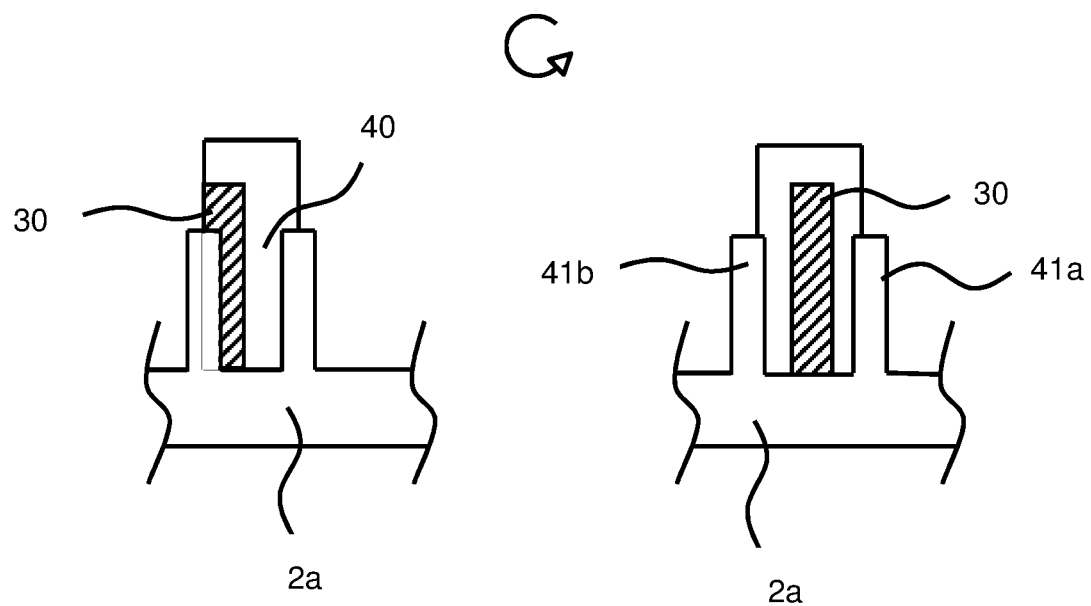
FIG. 4 illustrates another schematic representation of a sample vessel received in a slot of a carrier according to an embodiment of the present disclosure.

FIGS. 3 and 4 show schematic representations of the sample vessel 4 received in the slot 5 of the carrier 2a. On the left hand side, in FIGS. 3 and 4, a data carrier 30 provided on the sample vessel 4 is obscured in part by a structural element 31 of the carrier 2a. Because of such blind spot, the data carrier 30 cannot be correctly read out by the data carrier reader 22 when the sample vessel 4 is in the first position shown on the left hand side in FIGS. 3 and 4. In FIG. 3, the read-out window 40 can be limited on one side by the structural member 31 provided as a finger for holding or supporting the sample vessel 4 in the carrier 2a. In FIG. 4, a read-out window 40 can be limited on both sides by structural members 41a, 41b. In FIG. 4, the data carrier 30 can be provided in a center position with respect to the read-out window 40. In FIG. 3, the read out window can be open (not enclosed by some structural member) on one side.

The sample vessel 4 can be relocated by rotation for moving the sample vessel 4 in the second position (read out position) shown on the right hand side in FIGS. 3 and 4, thereby, positioning the data carrier 30 in a position with respect to the read-out window 40 providing improved visibility of the data carrier for reading with the data carrier reader 22.

The process for changing relative position of the data carrier 30 with respect to the read-out window 40 (shown in FIGS. 3 and 4) can be applied when the data carrier 2a is moved to the control station 20. Images of the sample vessel 4 can be gathered by the camera device 21. In the control station 23, the images can be processed by digital image analysis. Measurement data can be provided indicating measured characteristics of the data carrier 30 on the sample vessel 4, the sample vessel 4 being in the first or starting position (left hand side in FIGS. 3 and 4). In the control device 23, obscuring data can be provided indicating obscuring of the part of the data carrier 30 (blind spot) by the structural member 31, 41a, 41b of the carrier 2a. For example, the obscuring data may be determined by taking into account structural member data indicating at least one characteristic of the structural member 31, 41a, 41b selected from the following group: sides of the structural member, shape of the structural member, location of the structural member on the carrier 2a, sides of an obscured area (blind spot), and shape of the obscured carrier.

The obscuring data can be taken into account for determining corrected characteristics of the data carrier 30 being different from the measured characteristics and comprising a location of the data carrier 30 on the sample vessel 4 and a size of the data carrier 30. Based on the characteristics of the data carrier 30, control data can be generated by the control device 23 for relocating the sample vessel 4 relative to the read-out window 40 from the first position (see left hand side in FIGS. 3 and 4) to the second or read out position shown on the right hand side in FIGS. 3 and 4. In the process of relocating, the sample vessel 4 can be kept in the slot 5, but rotated for relative movement with respect to the read-out window 40.

Figure 5:
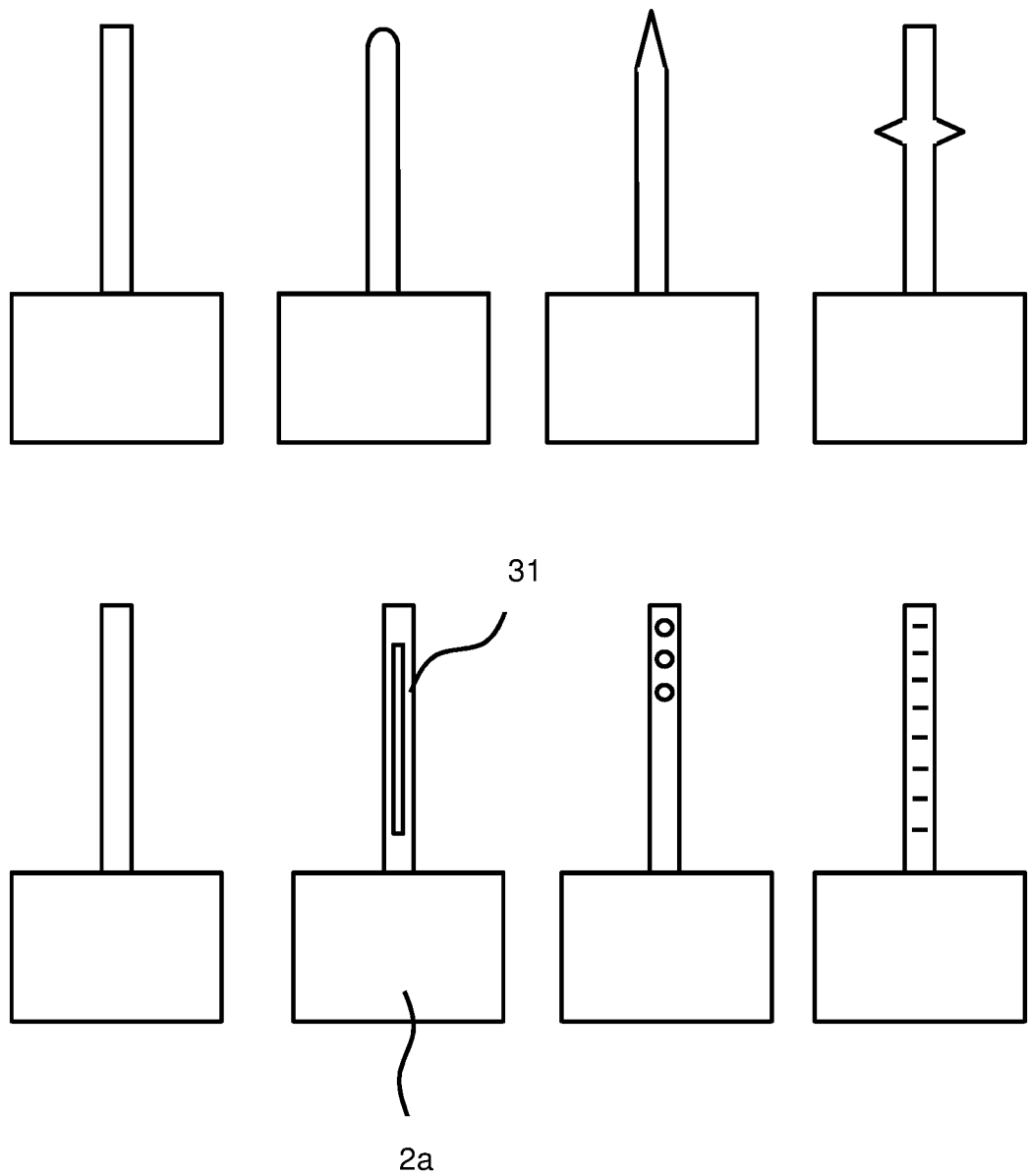
FIG. 5 illustrates a plurality of different structural members of a carrier provided as a holding finger having a different design according to an embodiment of the present disclosure.

The structural members 41a, 41b of the carriers 2a, 2b may be provided as an arrangement of the structural elements, for example, a plurality of the tines or fingers, the plurality of structural members having the same or different design. FIG. 5 shows a plurality of the design options for such structural elements.

With respect to determining the obscuring data, the following aspects may apply. A shape of the structural member 31, 41a, 41b may be recognized, e.g., if the shape of the structural member 31, 41a, 41b obscuring view of the camera device 21 is rectangular. Then, this rectangular shape can be detected by feature extraction from the images taken by the camera device 21, e.g., based on a Hough transformation or an edge detection.

The structural member 31, 41a, 41b such as a finger or tine may be recognized by color or brightness difference compared to the sample vessel 4. Alternatively, or in addition, a special marking on the structural member 31, 41a, 41b which can be detected by the camera device 21 may be recognized, such as specific color marking, specific shape, specific pattern and/or specific symbols on the outside of the structural member.

Alternatively, or in addition, a special marking of the body or housing of the carrier 2a, 2b may be taken into account.

For an arrangement of structural members 31, 41a, 41b known design, for example, one of the designs shown in FIG. 5, aspects may be recognized in the process applied in the control station 20. The known number of structural members and a distance between structural members may be applied for estimating the most likely position of the structural members obscuring the sample vessel.

One or more of the mentioned embodiments may be applied for improving the reliability of an overall structural member position detection process.

If several candidates for identification as a structural member of the carriers 2a, 2b have been identified in the image taken by the camera device 21 by one of the before mentioned methods, knowledge of distance between the structural member 41a, 41b and of the number of the structural members 41a, 41b can be used to determine which of those candidates are likely to actually be structural member such as fingers or tines. If, for example, two candidates have a smaller distance than the actual structural member distance, one of them can be ruled out. If, in another example, the number of candidates is higher than the actual number of structural members, one of them cannot actually be a structural member.

In addition, a pattern of structural member shapes with equal and known distance may be present and considered, optionally including a pattern of features or special markings on the structural members and/or the housing of the carrier 2a, 2b. Such structural member data can be matched to a set of features extracted in the image taken by the camera device 21 in the control device 23. The best match will give the most likely positions for the structural members.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. An arrangement for an in-vitro diagnostics system, the arrangement comprising:
   an automation track;
   a plurality of carriers configured to carry one or more sample vessels along the automation track, wherein the one or more sample vessels are each provided with a data carrier; and
   a control station placed along the automation track, the control station comprising,
      a camera device configured to detect images of a sample vessel from the one or more sample vessels received in a carrier from the plurality of carriers, the images showing the data carrier on the sample vessel at least in part,
      a data carrier reader configured to read the data carrier on the sample vessel carried by the carrier through a read-out window, wherein the read-out window is provided by an opening of the carrier at least partially enclosed by structural members of the carrier,
      a relocation device configured to relocate the sample vessel in the carrier in response to control data, and
      a control device in communication with the camera device and the relocation device and configured to
         provide measurement data indicating measured characteristics of the data carrier on the sample vessel when the sample vessel is located in a starting position, the measured characteristics determined from the images detected by the camera device,
         provide obscuring data indicating obscuring of a part of the data carrier by a structural member of the carrier when the images are detected while the sample vessel is located in the starting position,
         determine, from the measurement data and the obscuring data, characteristics of the data carrier being different from the measured characteristics and comprising location of the data carrier on the sample vessel and size of the data carrier, and
         provide, based on the characteristics of the data carrier, the control data configured to relocate the sample vessel relative to the read-out window from the starting position into a read-out position providing optimized visibility for reading the data carrier through the read-out window by the data carrier reader.

2. The arrangement of claim 1, wherein the data carrier comprises at least one of an one-dimensional barcode, a two-dimensional barcode, a three-dimensional barcode, a matrix barcode, and QR code.

3. The arrangement of claim 1, wherein the control device is further configured to determine the obscuring data by taking into account structural member data indicating at least one characteristic of the structural member selected from the following group: size of the structural member, shape of the structural member, location of the structural member on the carrier, size of an obscured area, and shape of the obscured area.

4. The arrangement of claim 1, wherein the read-out window is provided by an opening of the carrier at least partially enclosed by at least one of a wall member of the carrier and a fixing member provided for supporting the sample vessel on the carrier.

5. The arrangement of claim 1, wherein the measured characteristics of the data carrier determined from the images detected by the camera device indicate, for the data carrier, at least one of a measured size and a measured location in the sample vessel.

6. The arrangement of claim 1, wherein the control device is further configured to provide window data indicating at least one characteristic of the read-out window selected from the following group: size of the read-out window, shape of the read-out window, location of the read-out window on the carrier, and position of the read-out window relative to the data carrier reader.

7. The arrangement of claim 6, wherein the control device is further configured to determine characteristics of the data carrier from the measurement data, the obscuring data, and the window data.

8. The arrangement of claim 1, wherein the control device is further configured to determine the obscuring data by taking into account data indicating at least one characteristic of an arrangement of structural members from the following group: number of structural members, identification of a selected structural member potentially obscuring part of the data carrier and distance between structural members.

9. A method for operating an arrangement in an in-vitro diagnostics system, the method comprising:
   providing an automation track;
   providing a plurality of carriers carrying one or more sample vessels along the automation track, wherein the one or more sample vessels each are provided with a data carrier; and
   operating a control station placed along the automation track comprising,
      detecting, by a camera device, images of a sample vessel from the one or more sample vessels received in a carrier from the plurality of carriers, the images showing the data carrier provided on the sample vessel at least in part,
      reading, by a data carrier reader, the data carrier on the sample vessel carried by the carrier through a read-out window, wherein the read-out window is provided by an opening of the carrier at least partially enclosed by structural members of the carrier,
      relocating, by a relocation device, the sample vessel on the carrier in response to control data, and
      providing a control device in communication with the camera device and the relocation device, the control device comprising
         providing measurement data indicating measured characteristics of the data carrier on the sample vessel when the sample vessel is located in a starting position, the measured characteristics determined from the images detected by the camera device,
         providing obscuring data indicating obscuring of a part of the data carrier by a structural member of the carrier when the images are detected while the sample vessel is located in the starting position,
         determining, from the measurement data and the obscuring data, characteristics of the data carrier being different from the measured characteristics and comprising location of the data carrier on the sample vessel and size of the data carrier, and
         providing, based on the characteristics of the data carrier, the control data configured to relocate the sample vessel relative to the read-out window from the starting position into a read-out position providing optimized visibility for reading the data carrier through the read-out window by the data carrier reader.

* * * * *